This invention relates to a bearing for a rotatable shaft and more particularly to a bearing apparatus arranged to support a shaft which is rotating in a process fluid which is deleterious to bearing surfaces.

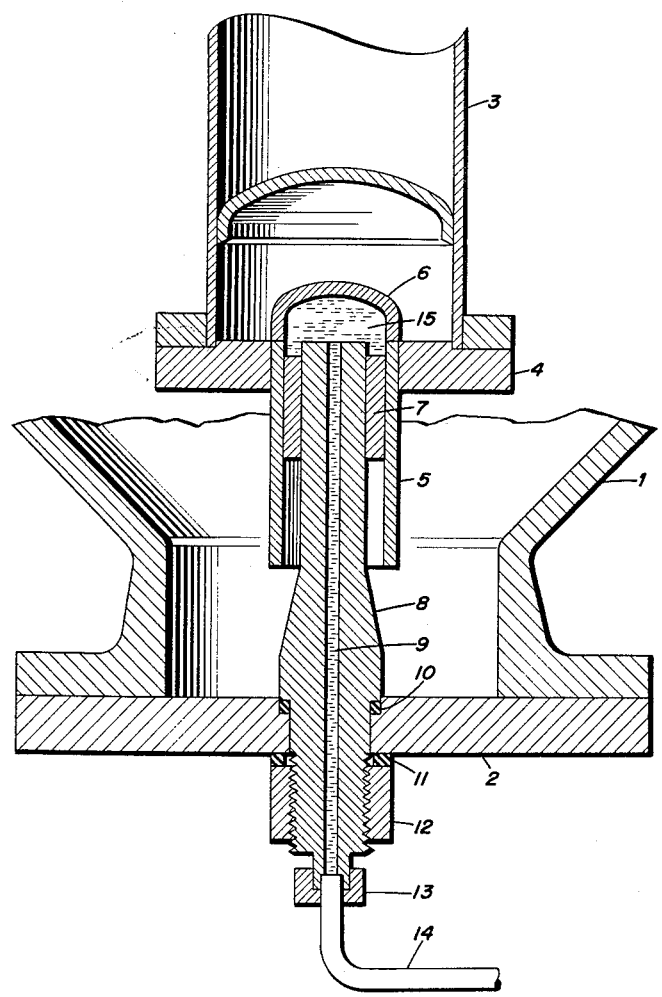
HENRI MERCIER
GASTON BRUN
INVENTORS 3,020,098
BEARING FOR ROTATABLE SHAFT
Henri Mercier, Gardanne, and Gaston Brun, Aix-en-Provence, France, assignors to Pechiney, Compagnie de Produits Chimiques et Electrometallurgiques, Paris, France, a corporation of France
Filed Apr. 3, 1959, Ser. No. 804,021
Claims priority, application France Apr. 9, 1958
1 Claim. (Cl. 308—36.3)

In industrial processes it is common to encounter situations demanding shafts which rotate within liquid, gaseous, or pulverulent mediums the constituents of which tend to penetrate the bearings in which the shafts are rotating. As a result of this penetration, corrosion or abrasion may take place, thus affecting the shaft by attacking the surfaces of the bearing so that the fit changes. This difficulty is encountered with various types of machines but particularly in the case of mixers, grinders and other devices the shafts of which come in contact with fluids having abrasive particles in suspension. These difficulties of the prior art devices have been obviated in a novel manner by the present invention.

It is, therefore, an outstanding object of the invention to provide a bearing for rotatable shafts which is protected by means of a fluid which is non-miscible with the surrounding medium, the fluid being kept under pressure sufficient to avoid the penetration of the surrounding medium into the bearing.

Another object of this invention is the provision of a bearing for a rotatable shaft for use in deleterious fluids in which a fluid is used to prevent penetration of the said deleterious fluid into the bearing, this fluid also acting as a lubricant.

A further object of the present invention is the provision of a bearing for use with shafts which are rotating in corrosive or abrasive fluids, a fluid medium being used in the bearing and the difference between the specific gravities of the fluids being positive or negative according to the disposition of the parts, so that gravity will act in favor of keeping the said fluid medium within the bearing.

It is another object of the instant invention to provide a bearing for rotatable shafts making use of a viscous fluid which contributes to maintaining the fluid in the bearing and prevents it from being replaced by a surrounding medium.

With these and other objects in view, as will be apparent to those skilled in the art, the invention resides in the combination of parts set forth in the specification and covered by the claim appended hereto.

The character of the invention, however, may be best understood by reference to one of its structural forms, as illustrated by the accompanying drawing in which:

The single FIGURE shows a vertical sectional view of a bearing incorporating the principles of the present invention.

Referring to the drawing, it can be seen that the apparatus is mounted in a tank 1 having a bottom 2 forming a part thereof. The lower end of a rotatable shaft 3 rests in a seating member 4 and is fixed thereto. Extending through the seating member 4 is a sleeve 5 which is closed at its upper end by a cap 6 fastened thereto by welding or other suitable method. Extending upwardly into the sleeve 5 is an axle 8; a bushing 7 is interposed between the inner surface of the sleeve 5 and an outer cylindrical surface of the axle 8. It will be understood that the axle 8 determines the axis of the rotation of the shaft 3. The bushing 7 is fastened to the inner surface of the sleeve 5 by welding or other suitable means, but its inner surface is rotatably movable relative to the cylindrical surface of the axle 8 and a plain bearing is thereby provided. The axle 8 extends through the bottom 2 of the tank 1 and is fastened thereto by means of a nut 12 which engages a lower threaded end of the axle. Suitable seals 10 and 11 prevent leakage from the tank around the aperture in which the axle 8 lies. Extending through the axle is a passage 9 which opens at both the upper and lower ends. At the lower end the passage communicates with a pipe 14 which is attached to the axle by means of a pressure joint 13 of a type well-known in the art. The other end of the pipe 14 is attached to a pressure fluid source (not shown).

The operation of the invention will now be readily understood in view of the above description. It is assumed that the tank 1 is filled with a process fluid which is either abrasive or corrosive and which would attack the bearing surfaces between the bushing 7 and the axle 8, if suitable means were not provided for preventing such action. For that purpose a pressure fluid is supplied to the pipe 14 and it passes through the channel 9 into a chamber 15 defined by the cap 6 and the upper ends of the axle 8 and the bushing 7. The fluid is then available to provide lubrication in the bearing surfaces between the axle 8 and the bushing 7. The pressure in the pipe 14 is maintained sufficiently high to overcome any pressure at the lower end of the bearing produced by the fluid in the tank. As a result, the deleterious liquid within the tank cannot penetrate into the bearing parts and abrasion and corrosion of the bearing are avoided.

An example of the use in which the present invention has been applied involved its use in supporting the stirrers in a vertical autoclave. The autoclave was used in the digestion of bauxite with sodium hydroxide under pressure. In spite of the presence of the very abrasive particles of bauxite and the corrosive quality of the concentrated sodium hydroxide solution in the autoclave (the process being carried on at a pressure of 30 kilograms per centimeter squared and at a temperature of 230° C.), the bearings, which were lubricated by injecting 20 cubic centimeters of oil per hour, do not show any signs of wearing after twelve months of continuous operation.

It can be seen that in the present application of the invention the chamber 15 lies above the bearing surfaces and the corrosive fluids would tend to enter the bearing from below, therefore, the lubricating fluid should be selected with a specific gravity greater than that of the deleterious process fluid. In the case where the bearing is in an inverted position it would be necessary that the lubricating fluid be lighter or of less specific gravity than the process fluid. It could be said, then, that the important features of the lubricant fluid which must be considered in applying the present invention are (1) that the fluid be kept under a pressure sufficient to avoid penetration of the deleterious fluid into the bearing space, (2) that the fluid be a lubricant, (3) that the fluid have the proper specific gravity either greater or less than the corrosive fluid, depending on the arrangement of the bearing, and (4) that the fluid have a high viscosity.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

An assembly comprising a rotatable vertical shaft mounted in a tank adapted to contain process fluid which is deleterious to bearing surfaces, comprising a stub axle vertically mounted in the tank, a bushing surrounding the axle and defining therewith opposed plain bearing surfaces, said shaft being connected to said bushing by a vertically elongated sleeve surrounding said bushing and having an opened lower end located a substantial distance below the bushing, said shaft being concentric with the bushing and axle, a cap overlying the axle and bushing and defining therewith a chamber, and a passage extending axially through the axle from the exterior of the tank into the chamber for conveying thereto a lubricating fluid, and a means for supplying to the passage a highly viscous lubricating fluid under pressure, which fluid has a substantially different specific gravity from the process fluid, and which is non-miscible therewith, whereby a separation plane between the lubricating fluid and the process fluid may be located between the bearing surfaces and the lower end of the sleeve.

References Cited in the file of this patent

UNITED STATES PATENTS

| | | |
|---|---|---|
| 1,987,157 | Pfleger | Jan. 8, 1935 |
| 2,022,384 | Paffen | Nov. 26, 1935 |
| 2,215,686 | Buchet | Sept. 24, 1940 |